United States Patent
Wu

(10) Patent No.: US 6,741,458 B2
(45) Date of Patent: May 25, 2004

(54) STAND FOR A FLAT PANEL DISPLAY

(75) Inventor: Wei-Chung Wu, Chung Ho (TW)

(73) Assignee: Amtran Technology Co. Ltd., Taipei (TW)

(*) Notice: Subject to any disclaimer, the term of this patent is extended or adjusted under 35 U.S.C. 154(b) by 70 days.

(21) Appl. No.: 10/242,084

(22) Filed: Sep. 12, 2002

(65) Prior Publication Data

US 2004/0052038 A1 Mar. 18, 2004

(51) Int. Cl.⁷ .................................. F16M 13/00
(52) U.S. Cl. ............... 361/681; 361/679; 361/683; 248/921; 248/923; 248/371; 16/337
(58) Field of Search .................... 361/679, 681, 361/683, 682; 248/184.1, 917, 918, 921, 923, 139, 174, 166, 222.41, 224.61, 276.11, 295.11, 920, 922, 292.12, 398, 165.1, 292.13; 16/340, 337; 349/58, 59, 60; 312/223.1–223.6; 345/169, 905; D14/100–113; D18/1–12

(56) References Cited

U.S. PATENT DOCUMENTS 5,831,696 A * 11/1998 Sheng .................... 349/58
5,915,658 A * 6/1999 Sheng ................ 248/346.06
6,354,552 B1 * 3/2002 Chiu ....................... 248/422
6,581,893 B1 * 6/2003 Lu ........................ 248/291.1

* cited by examiner

Primary Examiner—Michael Datskovsky
(74) Attorney, Agent, or Firm—Trop, Pruner & Hu, P.C.

(57) ABSTRACT

A stand for a flat panel display, such as an LCD display, includes a base member, a one-piece bracket plate, and a pair of mounting units for mounting pivotally the panel display. The bracket plate includes a planar support member, a front connecting member projecting forwardly from a lower end of the support member, and two bracing members projecting rearwardly from two lateral ends of the support member. Two connecting members project respectively rightward and leftward from lower ends of the bracing members. The front connecting member is secured on the base member. The support member has an upper edge with a length larger than that of the lower end thereof. The bracket plate defines right and left corners at the lateral ends so as to reinforce bending strength thereof.

4 Claims, 11 Drawing Sheets

US 6,741,458 B2

STAND FOR A FLAT PANEL DISPLAY

BACKGROUND OF THE INVENTION

1. Field of the Invention

This invention relates to a stand for a flat panel display, more particularly to a stand with a base member and a one-piece bracket plate attached to the base member for supporting a flat panel display, such as an LCD display.

2. Description of the Related Art

Referring to FIGS. 1 and 2, a conventional stand 8 for an LCD display 9 is shown to include a one-piece stamped plate with two slits 82 and a fold line 85. The stamped plate is folded upwardly to form an upright bracket part 80 and a base part 83. The bracket part 80 is then bent rearward to have an inclined upper mounting portion 802 with two pairs of screw holes 81 so as to connect with a pair of mounting units (not shown) for mounting pivotally the LCD display 9. However, as shown in FIG. 3, no bracing means is provided to brace the inclined upper mounting portion 802, thereby resulting in weak strength and easy deformation of the inclined upper mounting portion 802 when a force (F) is applied on the LCD display 9.

Referring to FIGS. 4 and 5, another conventional stand 7 is shown to include a base member 73 and a one-piece bracket plate 72 secured on the base member 73. The bracket plate 72 includes a planar support member 722, a front connecting member 720 which projects forwardly from a lower end of the planar support member 722 by folding the bracket plate 72 and which is secured on the base member 73, right and left bracing members 724, 723 which project rearwardly and respectively from lateral ends of the planar support member 722 by folding the bracket plate 72, right and left connecting members 726, 725 which project respectively rightward and leftward from lower ends of the right and left bracing members 724, 723 by bending the bracket plate 72, and two upper mounting members 728 which project rearwardly and respectively from an upper edge 727 of the planar support member 722 by folding the bracket plate 72 and which have screw holes 71 to connect with two mounting units (not shown) for mounting pivotally an LCD display. Although the right and left bracing members 724, 723 can brace the upper mounting members 728, they are not formed integrally with the upper mounting members 728, thereby resulting in insufficient bending strength of the upper mounting members 728. Moreover, the bracket plate 72 is complicated in construction, and the material thereof cannot be reduced.

SUMMARY OF THE INVENTION

The object of the present invention is to provide a stand for a flat panel display which has a reinforced bending strength.

According to this invention, the stand includes a base member with an upper major wall surface, a one-piece bracket plate, and a pair of mounting units. The bracket plate includes a planar support member having a lower end which extends in a longitudinal direction immediately above the upper major wall surface of the base member to define a first length, an upper edge which extends in the longitudinal direction to define a second length and which is opposite to the lower end in an upright direction, and a planar major wall which extends from the lower end to the upper edge and which has right and left lateral ends that are opposite to each other in the longitudinal direction. A front connecting member projects forwardly from the lower end of the planar support member, and is superimposed upon and is secured on the upper major wall surface of the base member. Right and left bracing members project rearwardly and respectively from the right and left lateral ends of the planar major wall, and have right and left lower ends immediately above the upper major wall surface of the base member. Right and left connecting members project respectively rightward and leftward from the right and left lower ends of the planar major wall, and are superimposed upon and are secured on the upper major wall surface of the base member. The mounting units are respectively attached to the planar major wall adjacent to the upper edge. The first length of the lower end is smaller than the second length of the upper edge. The right and left lateral ends diverge from the lower end to the upper edge. The bracket plate defines right and left corners at the right and left lateral ends. The corners extend to the upper edge.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
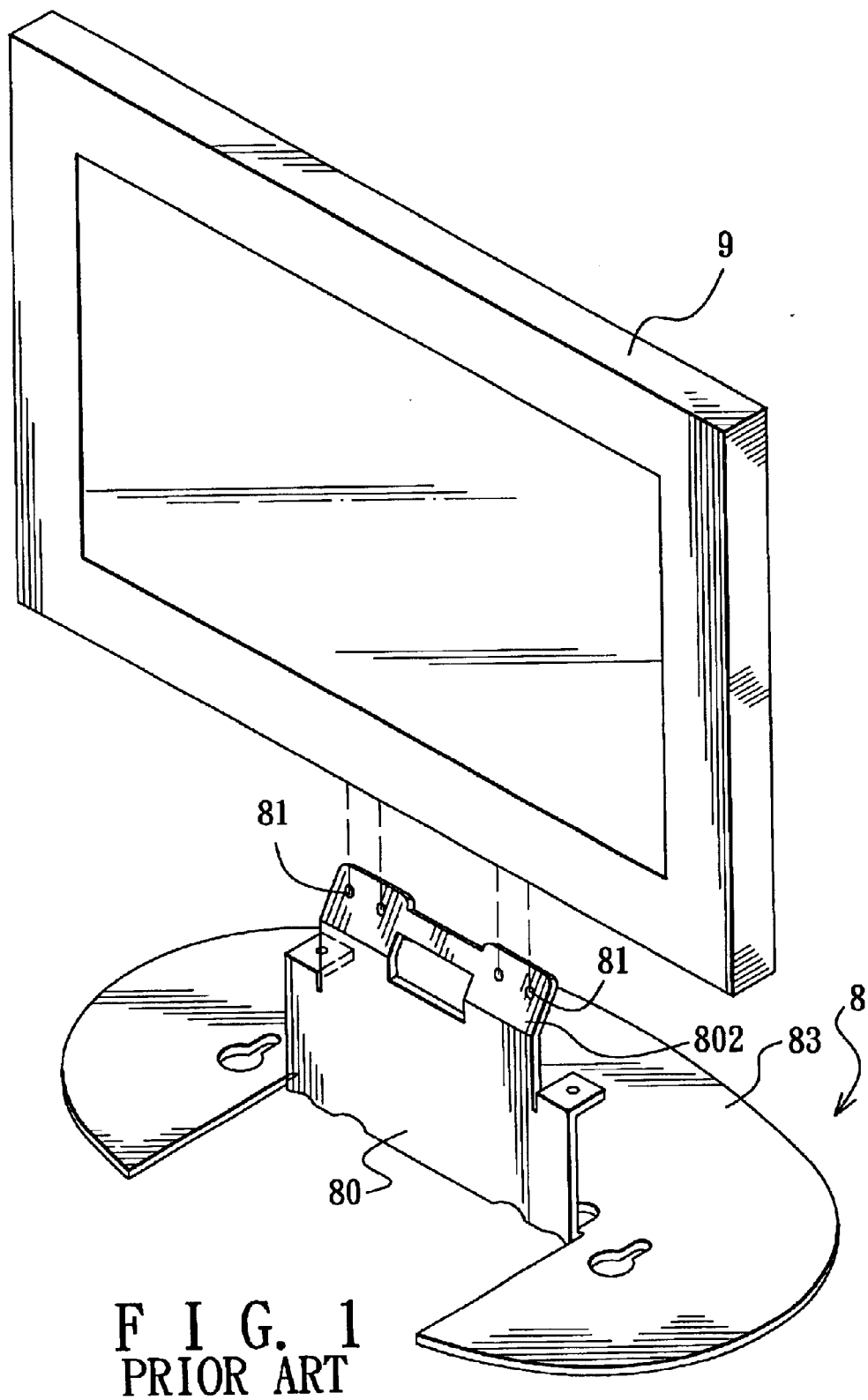
FIG. 1 is a perspective view of a conventional stand adapted for mounting an LCD display.
Figure 2:
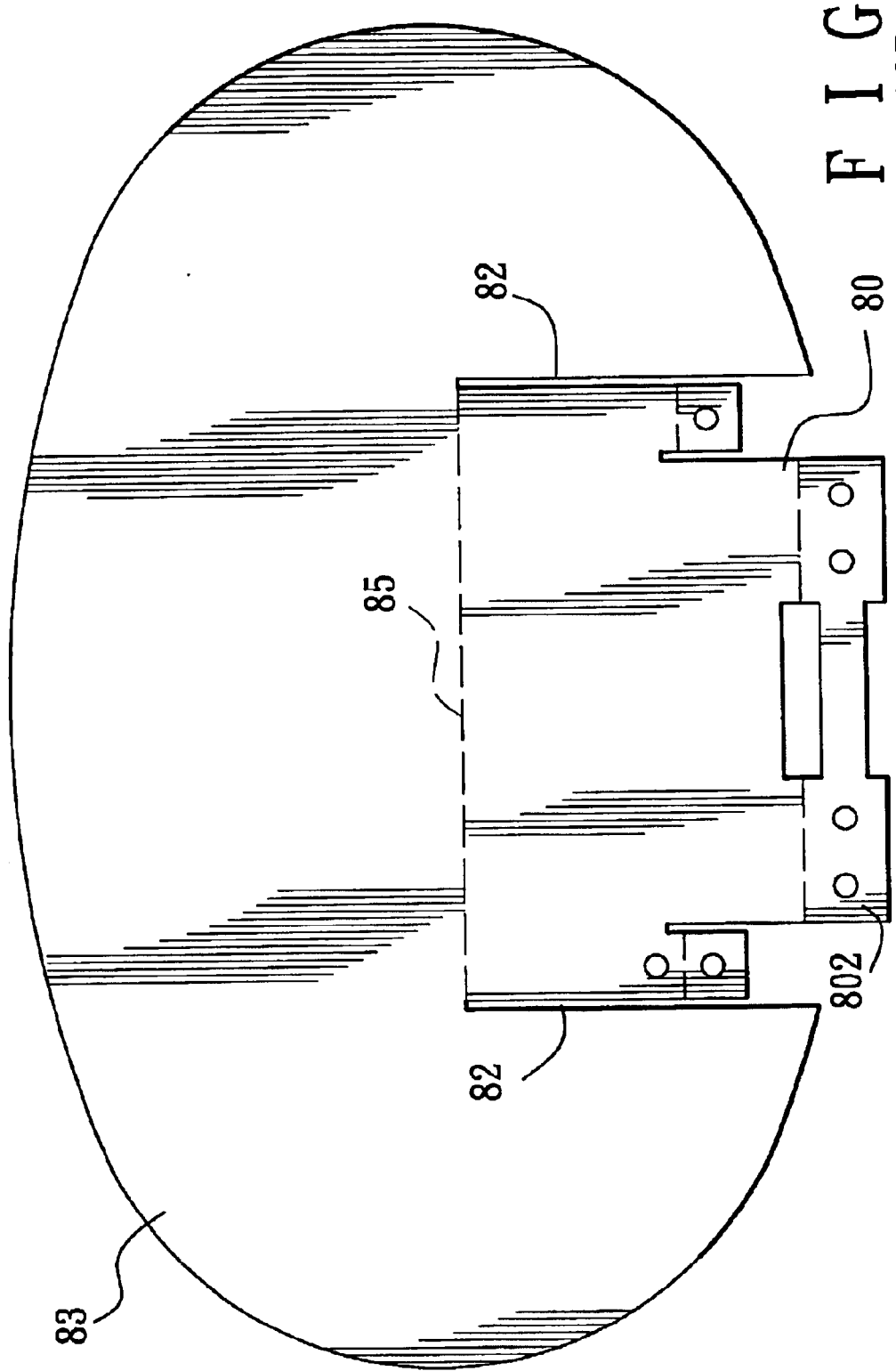
FIG. 2 is a schematic view of a bracket plate of the conventional stand shown in a planar configuration.
Figure 3:
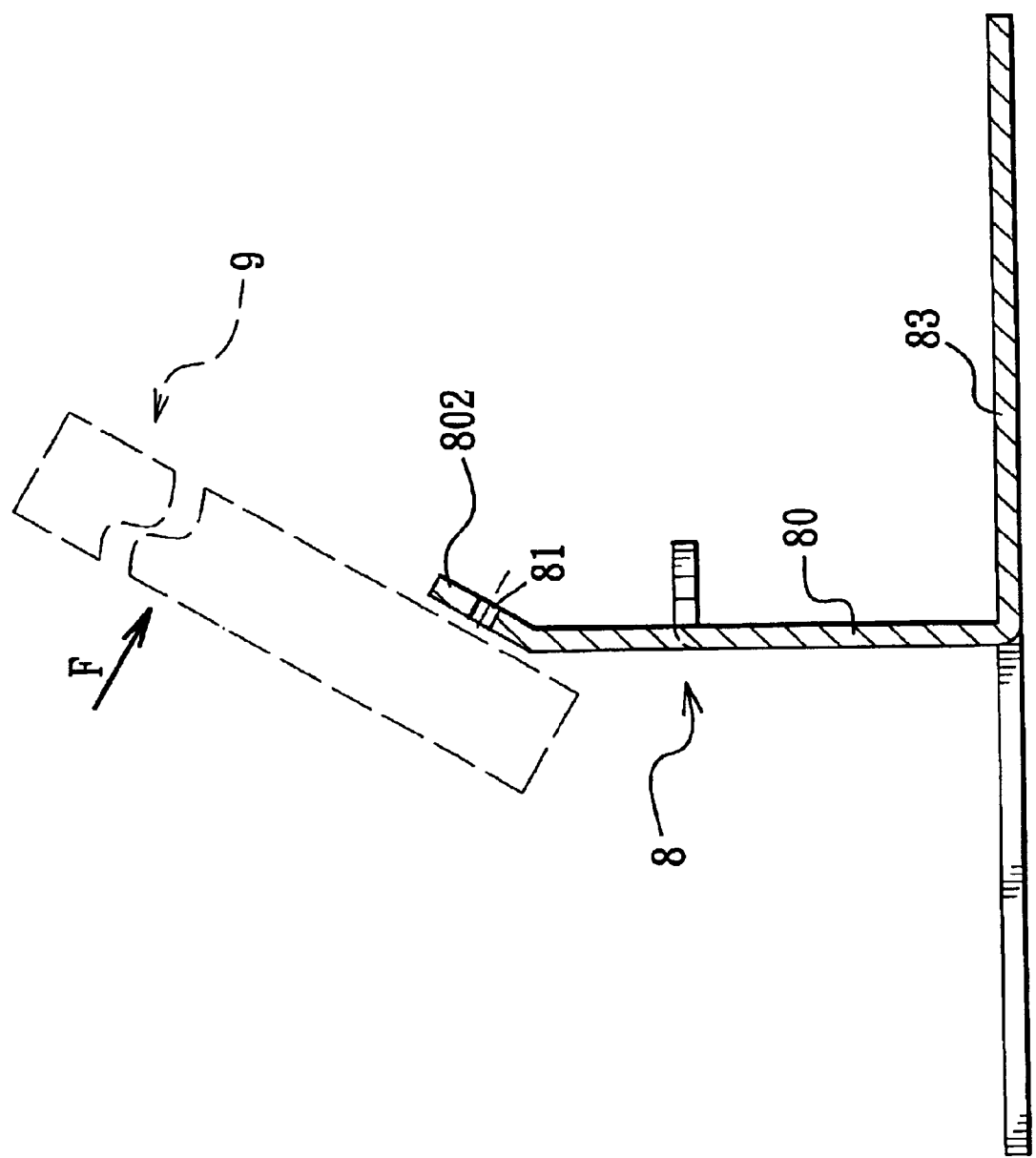
FIG. 3 is a sectional view of the conventional stand adapted for mounting an LCD display.
Figure 4:
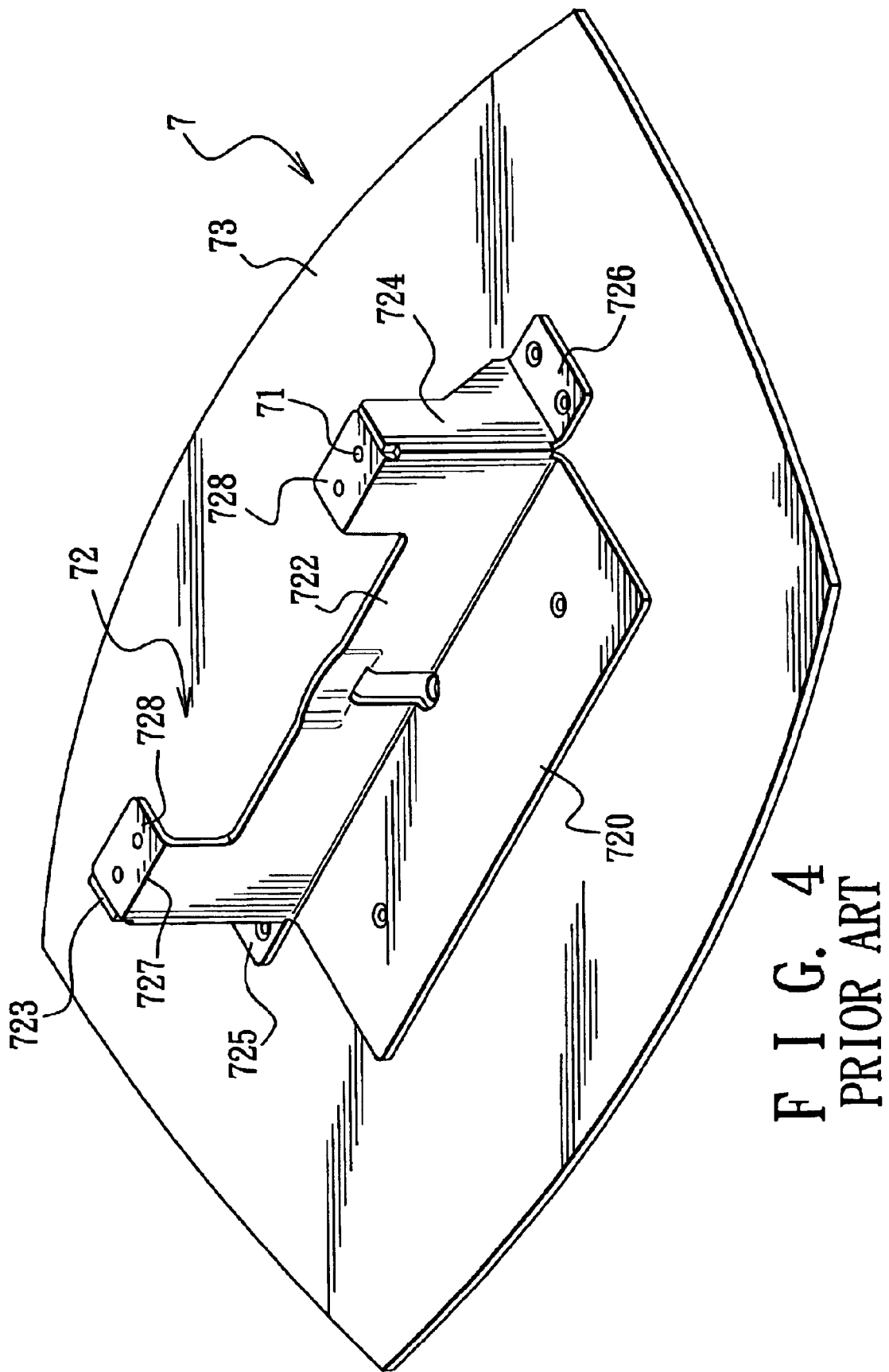
FIG. 4 is a perspective view of another conventional stand.
Figure 5:
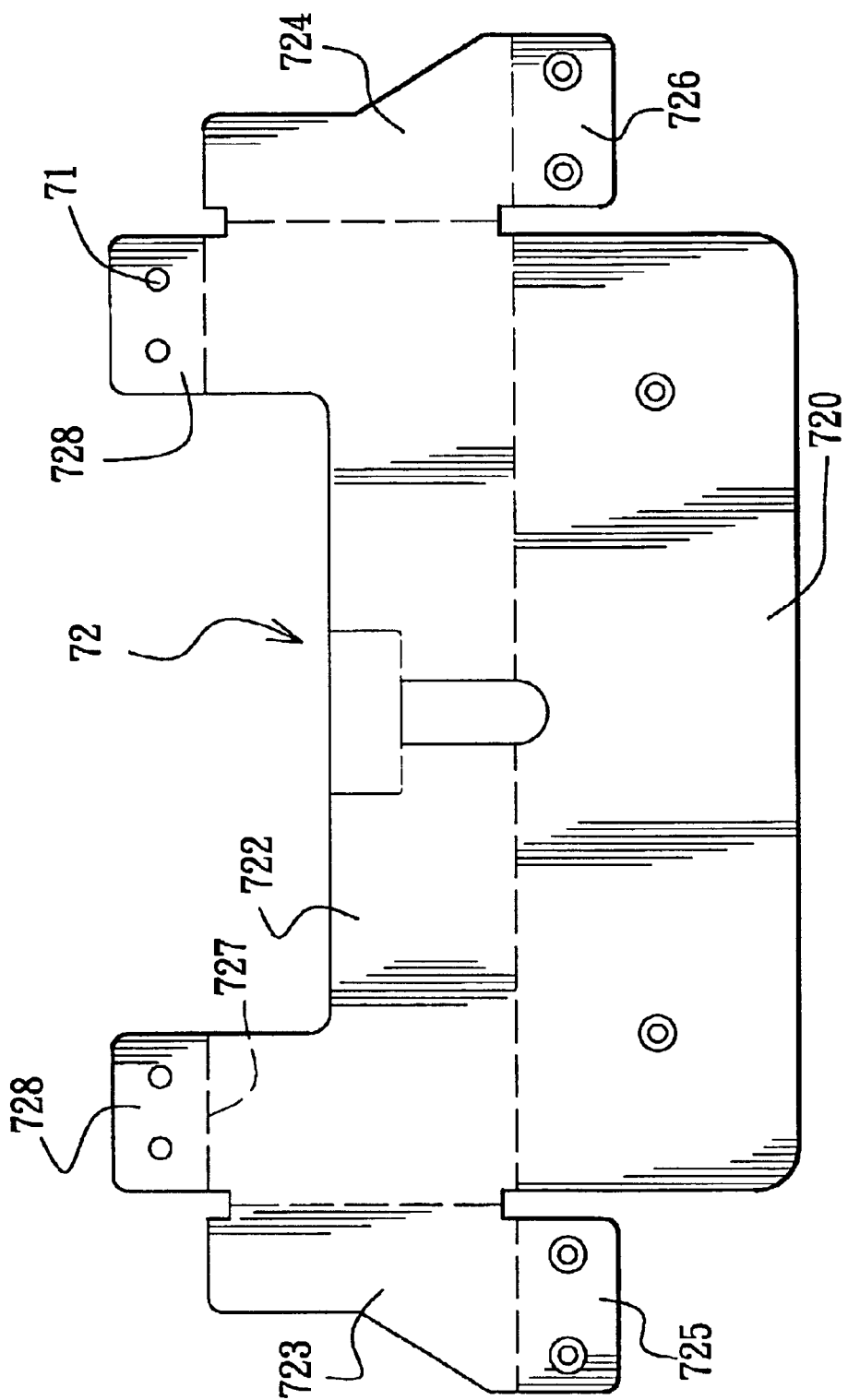
FIG. 5 is a schematic view of a bracket plate of the conventional stand shown in a planar configuration.
Figure 6:
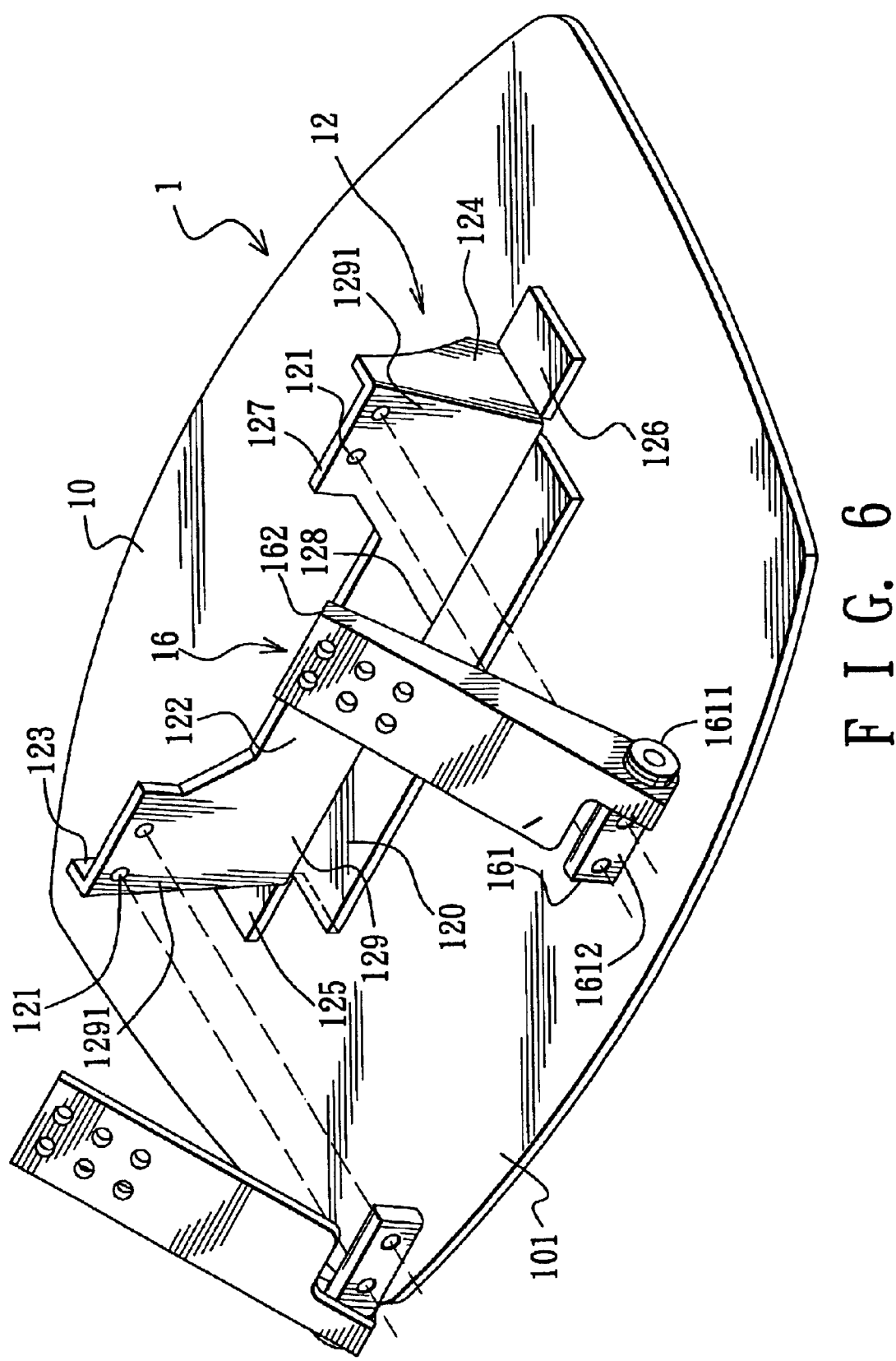
FIG. 6 is a perspective view of a preferred embodiment of a stand according to this invention.

Referring to FIG. 6, the preferred embodiment of a stand 1 according to the present invention is shown to comprise a base member 10 and a one-piece bracket plate 12 which are formed of steel plates, and a pair of mounting units 16.

The base member 10 has an upper major wall surface 101.

Figure 7:
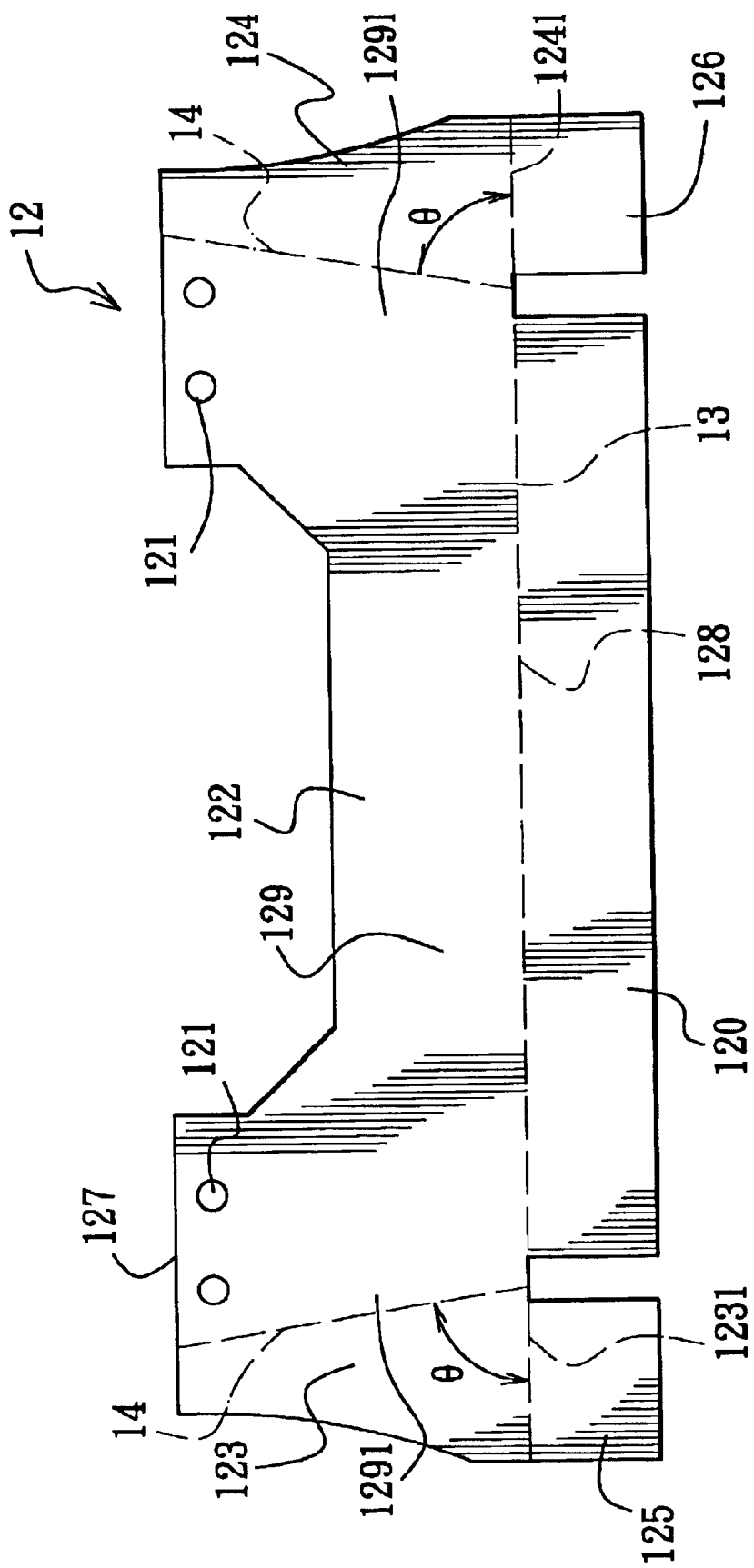
FIG. 7 is a schematic view of a bracket plate of the stand of the preferred embodiment shown in a planar configuration.

With reference to FIG. 7, the bracket plate 12 has a straight first fold line 13 which extends in a longitudinal direction, a pair of straight second fold lines 14 which extend respectively from two ends of the first fold line 13 in a transverse direction relative to the longitudinal direction and which diverge from the first fold line 13. The bracket plate 12 includes a planar support member 122, a front connecting member 120, right and left bracing members 124, 123, and right and left connecting members 126, 125.

The planar support member 122 has a lower end 128 which extends along the first fold line 13 to define a first length immediately above the upper major wall surface 101 of the base member 10, an upper edge 127 which extends in the longitudinal direction to define a second length and which is opposite to the lower end 128 in an upright direction, and a planar major wall 129 which extends from the lower end 128 to the upper edge 127 and which has right and left lateral ends 1291 that are opposite to each other in the longitudinal direction. The planar major wall 129 has a plurality of screw holes 121 formed adjacent to the upper edge 127.

Note that due to diverging of the second fold lines 14 from the first fold line 13, the first length of the lower end 128 is smaller than the second length of the upper edge 127, and the right and left lateral ends 1291 diverge from the lower end 128 to the upper edge 127.

The front connecting member 120 projects forwardly from the lower end 128 of the support member 122 by folding the bracket plate 12 along the first fold line 13, and is superimposed upon and is secured on the upper major wall surface 101 of the base member 10.

The right and left bracing members 124, 123 project rearwardly and respectively from the right and left lateral ends 1291 of the planar major wall 129 of the support member 122 by folding the bracket plate 12 along the second fold lines 14. The right and left bracing members 124, 123 respectively have right and left lower ends 1241, 1231 immediately above the upper major wall surface 101 of the base member 10.

The right and left connecting members 126, 125 project respectively rightward and leftward from the right and left lower ends 1241, 1231 of the right and left bracing members 124, 123 by folding the bracket plate 12, and are superimposed upon and are secured on the upper major wall surface 101 of the base member 10.

Figure 8:
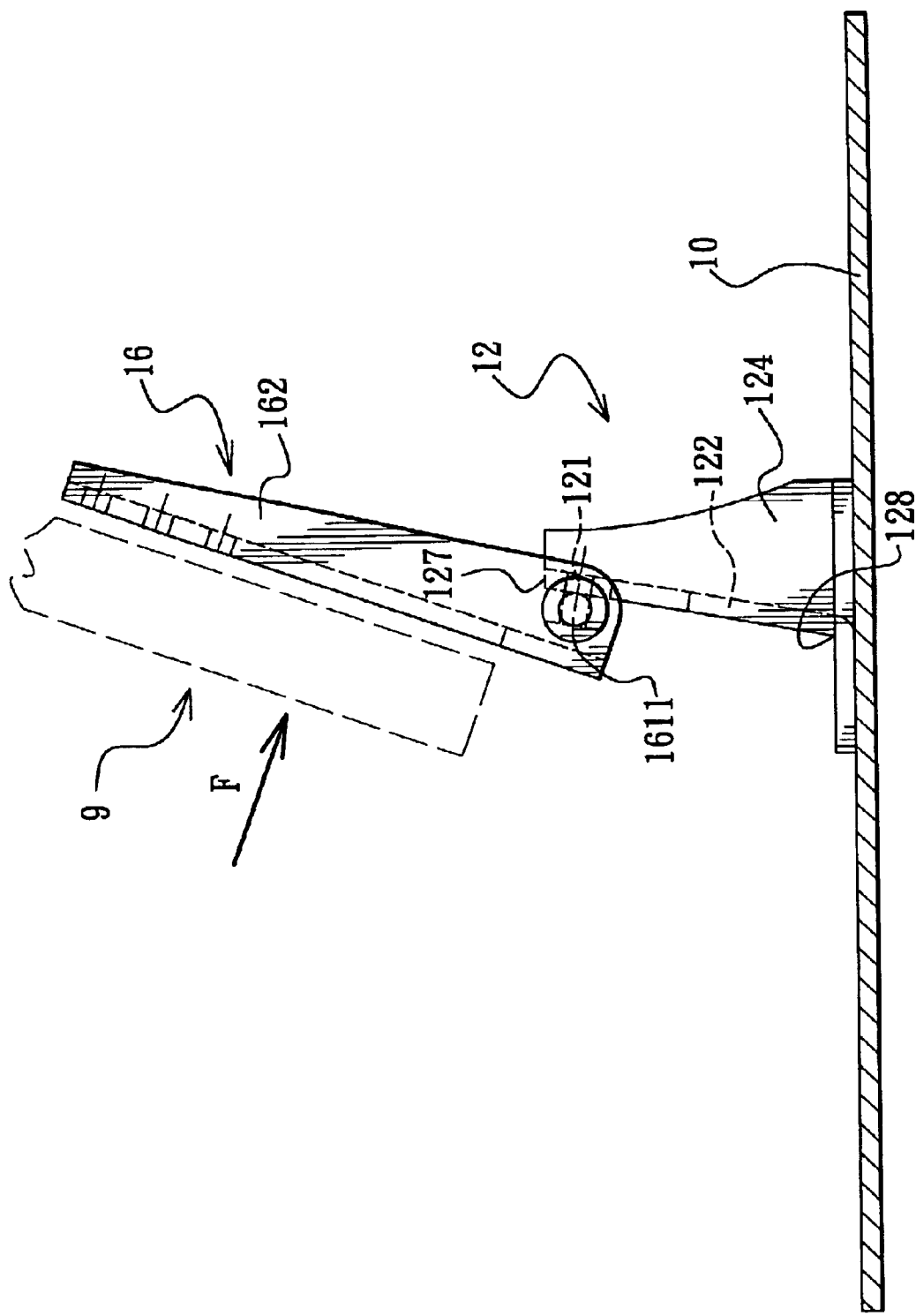
FIG. 8 is a partly sectional view of the preferred embodiment adapted for mounting an LCD display.

The mounting units 16 are respectively attached to the planar major wall 129 adjacent to the upper edge 127. Each mounting unit 16 includes a one-piece pivot member 161 and a mounting plate 162. The pivot member 161 includes a cylindrical pivot part 1611 and a flat stem 1612. The flat stem 1612 extends in the longitudinal direction, and is secured on the planar major wall 129 by means of screw fasteners (not shown) that engage threadedly the screw holes 121. The cylindrical pivot part 1611 projects outward from the corresponding one of the right and left lateral ends 1291. The mounting plate 162 is mounted pivotally on the cylindrical pivot part 1611 so as to be adapted to mount an LCD display 9 thereon, as shown in FIG. 8.

The bracket plate 12 defines right and left corners at the right and left lateral ends 1291. The corners extend along the second fold lines 14 to the upper edge 127. In addition, each of the second fold lines 14 forms an obtuse angle with the first fold line 13 such that, after the bracket plate 12 is secured on the upper major wall surface 101 of the base member 10, the planar major wall 129 inclines rearward to form an acute included angle θ with the upper major wall surface 101. As a result, the bending strength of the bracket plate 12 is reinforced. When a force (F) is applied to the LCD display 9 to turn the mounting plate 162 relative to the cylindrical pivot part 1611, deformation of the bracket plate 12 can be prevented. Moreover, since the right and left lateral ends 1291 diverge from the lower end 128 to the upper edge 127, the material and weight of the bracket plate 12 can be reduced without affecting adversely the strength thereof, and the bracket plate 12 can support a relatively large LCD display 9.

Figure 9:
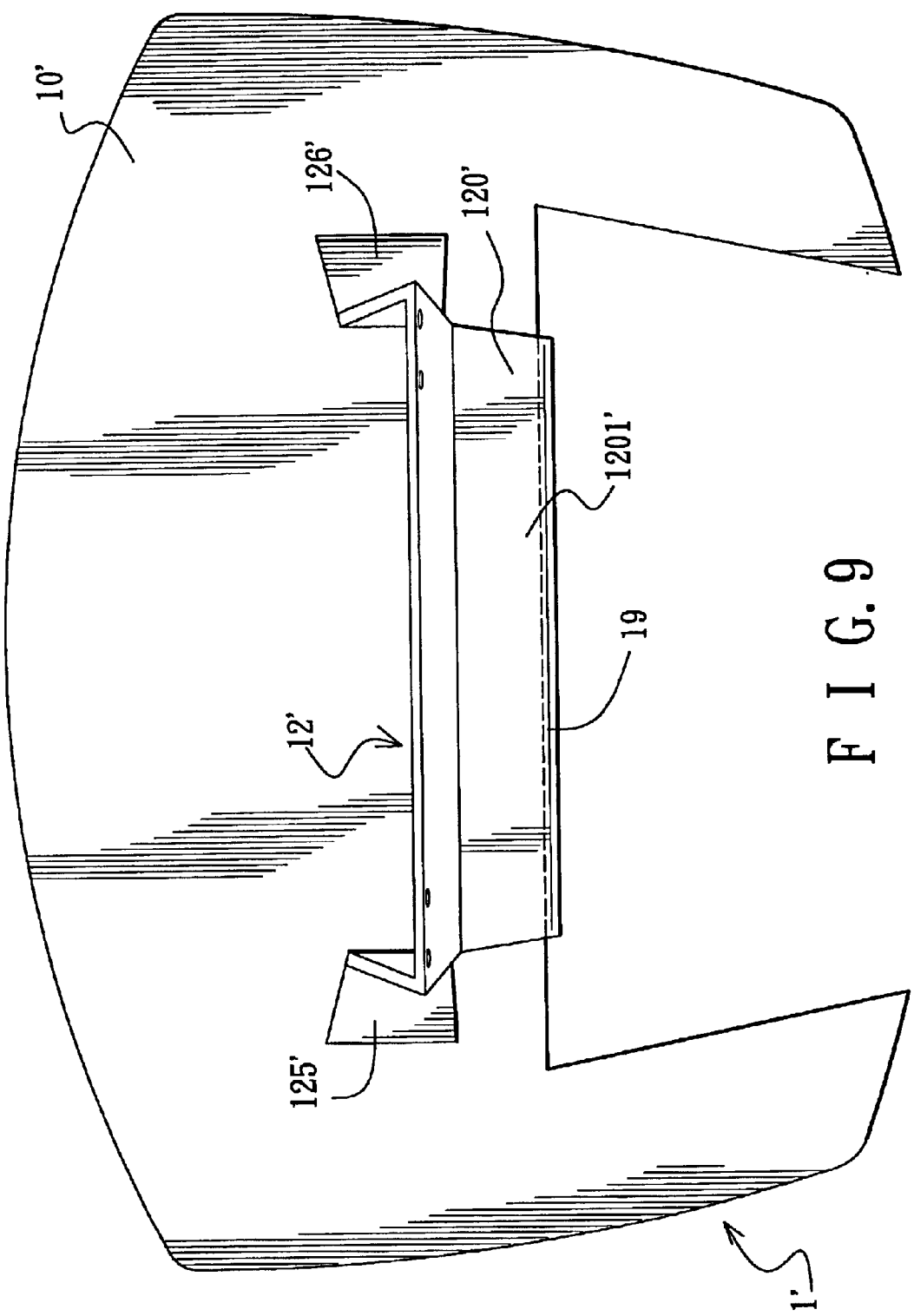
FIG. 9 is a perspective view of a portion of another preferred embodiment of the stand according to this invention taken from a top thereof.
Figure 10:
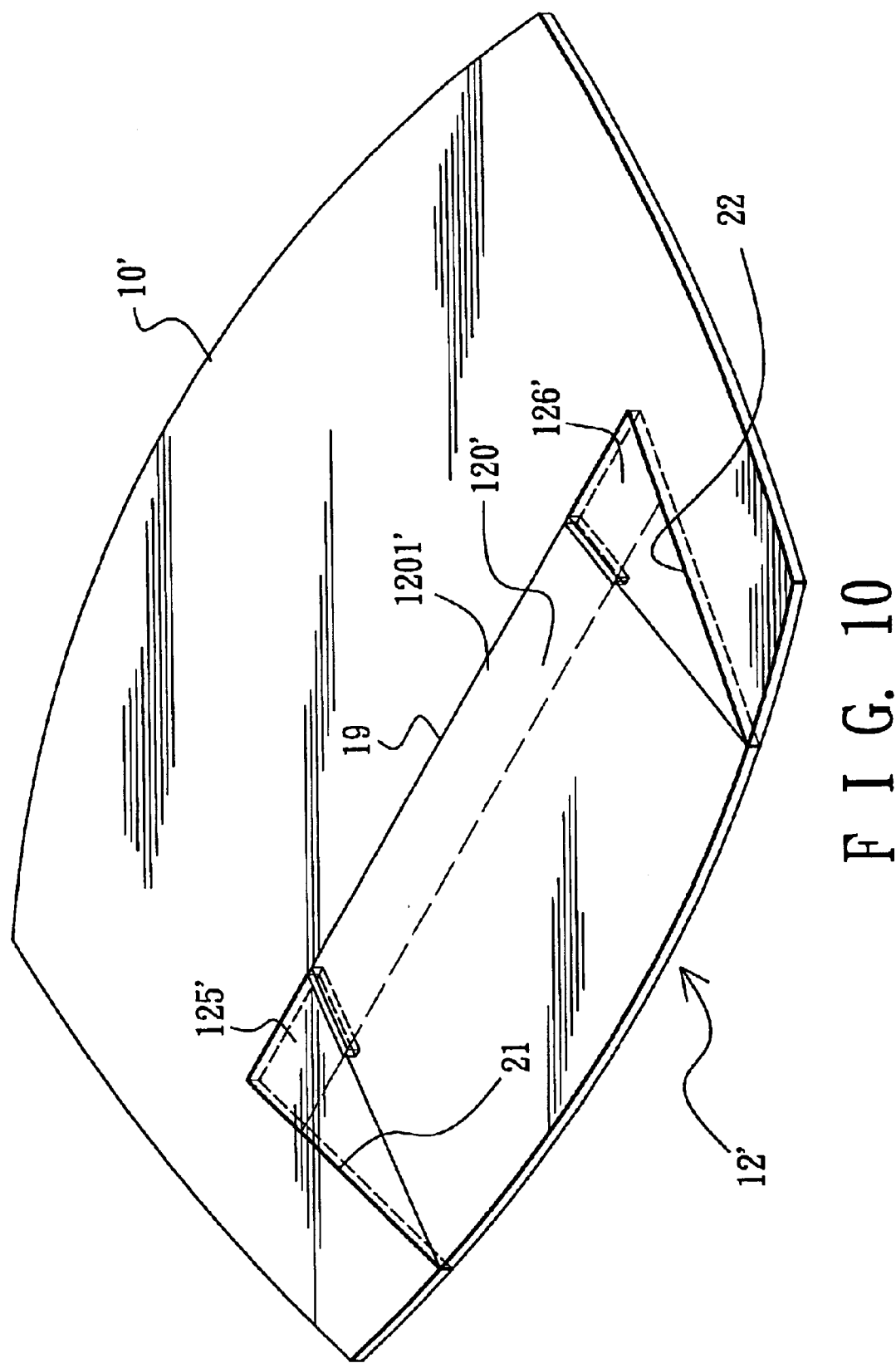
FIG. 10 is a perspective view of the preferred embodiment shown in a planar configuration.
Figure 11:
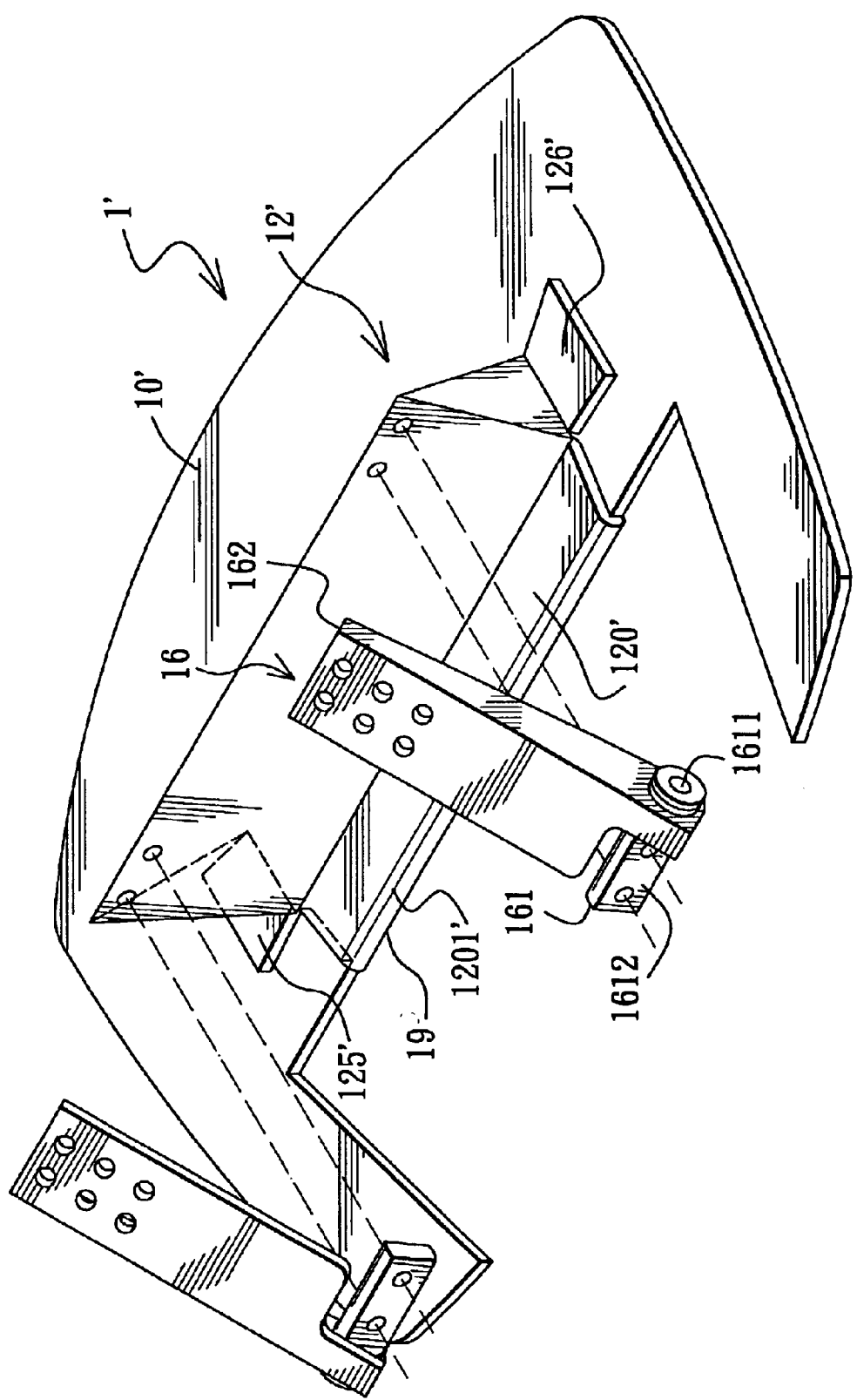
FIG. 11 is a perspective view of the preferred embodiment.

Referring to FIGS. 9 to 11, another preferred embodiment of the stand 1' of the present invention is shown to include a base member 10' and a bracket plate 12'. The base member 10' and the bracket plate 12' are formed of a one-piece steel plate which includes two slits 21, 22 and a folding connection line 19 connecting the slits 21, 22. The steel plate is folded rearward along the folding connection line 19 so as to form the bracket plate 12' over the base member 10'. A front connecting member 120' of the bracket plate 12' has a frontmost end 1201' connected to the folding connection line 19. The bracket plate 12' is bent to form the right and left connecting members 126', 125', thereby resulting in material savings.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A stand for a flat panel display, comprising:
   a base member with an upper major wall surface;
   a one-piece bracket plate including:
     a planar support member having a lower end which extends in a longitudinal direction immediately above said upper major wall surface to define a first length, an upper edge which extends in the longitudinal direction to define a second length and which is opposite to said lower end in an upright direction, and a planar major wall which extends from said lower end to said upper edge and which has right and left lateral ends that are opposite to each other in the longitudinal direction,
     a front connecting member projecting forwardly from said lower end, and superimposed upon and secured on said upper major wall surface of said base member,
     right and left bracing members projecting rearwardly and respectively from said right and left lateral ends, and having right and left lower ends immediately above said upper major wall surface of said base member, and
     right and left connecting members projecting respectively rightward and leftward from said right and left lower ends, and superimposed upon and secured on said upper major wall surface of said base member; and
   a pair of mounting units respectively attached to said planar major wall adjacent to said upper edge, wherein the first length of said lower end is smaller than the second length of said upper edge and said right and left lateral ends diverge from said lower end to said upper edge, and said bracket plate defines right and left corners at said right and left lateral ends, said corners extending to said upper edge.

2. The stand as claimed in claim 1, wherein said bracket plate has a straight first fold line and a pair of straight second fold lines along which said bracket plate is bent, said right and left lateral ends respectively extending along said second fold lines, said lower end extending along said first fold line, said right and left corners extending respectively along said second fold lines, each of said second fold lines forming an obtuse angle with said first fold line such that said planar major wall inclines rearward after said bracket plate is secured to said base member.

3. The stand as claimed in claim 1, wherein each of said mounting units includes a one-piece pivot member and a mounting plate, said pivot member including a cylindrical pivot part and a flat stem, said flat stem extending in the longitudinal direction and being attached to said planar major wall adjacent to said upper edge and a corresponding one of said right and left corners, said cylindrical pivot part projecting outward from a corresponding one of said right and left corners, said mounting plate being mounted pivotally on said cylindrical pivot part.

4. The stand as claimed in claim 1, wherein said base member and said bracket plate are formed from a one-piece metal plate which includes a folding connection line and which is folded back along said folding connection line so as to form said bracket plate over said base member, said front connecting member having a frontmost end connected to said folding connection line.

\* \* \* \* \*